United States Patent [19]

Buckman et al.

[11] 3,799,354
[45] Mar. 26, 1974

[54] FLUID FILTER ELEMENTS

[75] Inventors: Kenneth Ernest Buckman, Winsor near Woodlans; Kenneth Arthur Rogers, Eastleigh, both of England

[73] Assignee: General Motors Corporation, Detroit, Mich.

[22] Filed: Feb. 12, 1973

[21] Appl. No.: 331,570

[30] Foreign Application Priority Data
Mar. 11, 1972  Great Britain.................... 11463/72

[52] U.S. Cl.................... 210/493, 210/497, 55/498, 55/521
[51] Int. Cl............................................. B01d 27/06
[58] Field of Search ...... 210/493, 497; 55/498, 521, 55/497, 499

[56] References Cited
UNITED STATES PATENTS
3,058,594  10/1962  Hultgren............................ 210/493
3,531,920  10/1970  Hart.................................. 210/493
3,662,895  5/1972  Tuffnell et al..................... 210/493
3,662,893  5/1972  Humbert, Jr....................... 210/493

*Primary Examiner*—Samih N. Zaharna
*Assistant Examiner*—F. F. Calvetti
*Attorney, Agent, or Firm*—Peter A. Taucher

[57] ABSTRACT

A liquid filter element is formed as a hollow tubular assembly of pleated filter paper or like material the pleats being of "W" form (viewed looking inwardly from the outer periphery of the element) with alternate wide and narrow pleats, at least the wide pleats having spacer formations impressed therein to space the two parts of each wide pleat from each other and from adjacent narrow pleats and to space the wide pleats from each other at the inner periphery of the element, and the pleat fold lines being arranged so as to form creases of rectangular "U" section, with widened portions at the junctions between adjacent wide and narrow pleats at opposite ends of the element, and intermediate the ends, the abutment of the spacer formations and widened fold line portions ensuring uniform circumferential spacing and radial disposition of the pleats.

6 Claims, 14 Drawing Figures

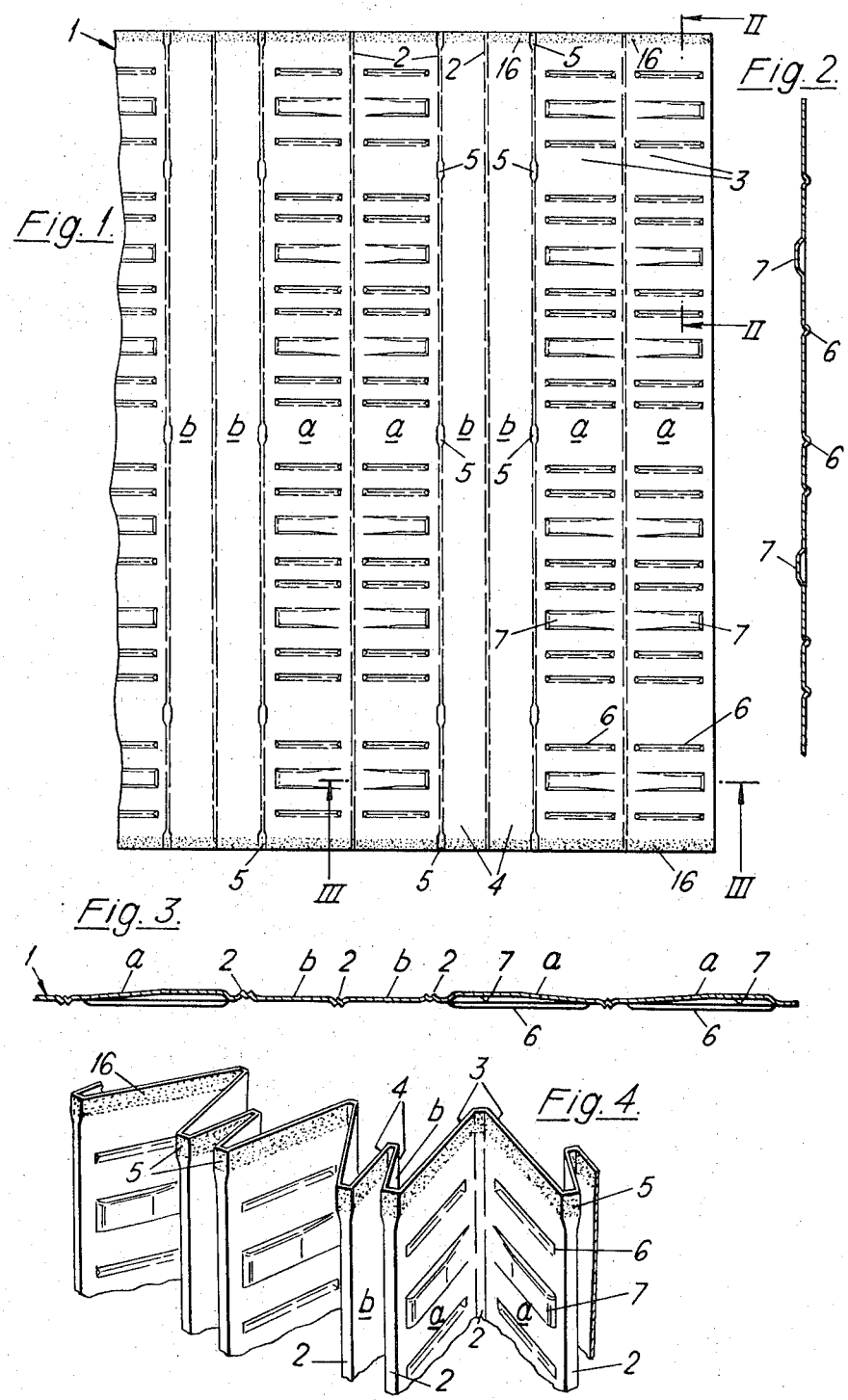

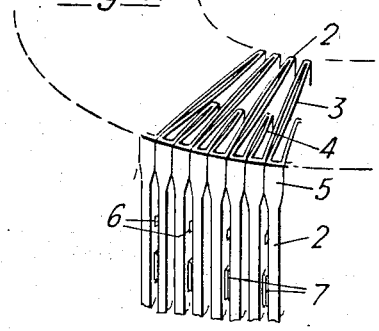
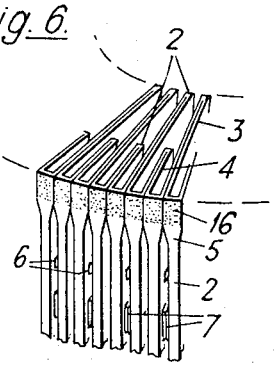
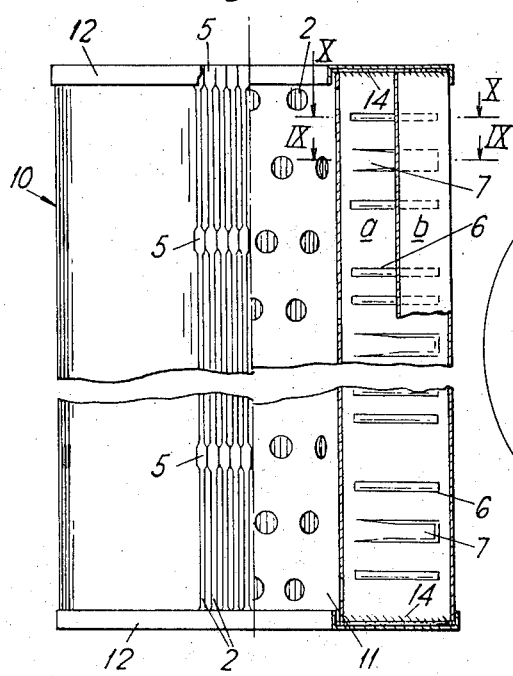
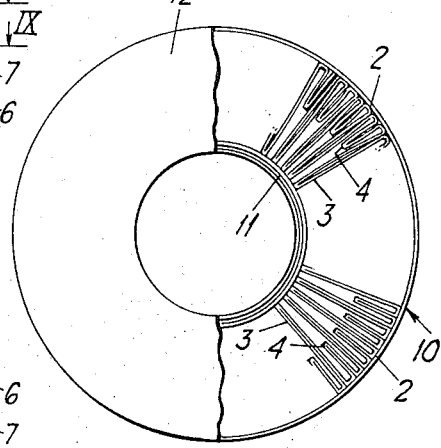
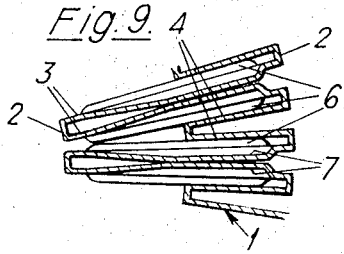
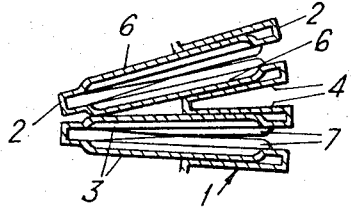

FLUID FILTER ELEMENTS

This invention relates to filter elements for the filtration of fluids and more particularly to filter elements which are intended for the filtration of liquids and in which the element is formed from a strip of sheet filter material folded in zig-zag fashion so as to reduce the space occupied by a filter element of relatively large area. The present invention is suitable in particular for filters for use in filtering the oil in internal combustion engine lubrication systems, but is also suitable for the filtration of other liquids and gases.

In this specification the term "pleat" is used to denote the structure formed by folding a strip of material upon itself, the strip of material thereby being formed into two portions which are integrally and hingedly connected at a fold line (or crease) therebetween.

It is well known to form an oil filter element from a strip of synthetic resin impregnated filter paper or like sheet filter material which is folded about transverse spaced fold lines so as to form a plurality of accordion pleats, the ends of the strip being joined together and the assembly of pleats then being fitted over a perforate centre tube to form a hollow tubular filter element in which the pleats radiate in star form from the perforate centre tube. In such elements the ends of the pleats may be individually sealed or each end of the pleated assembly may be sealed to annular end caps.

Such filter elements do not make the optimum use of the space occupied by the filter material because the spacing between the pleats adjacent the outer periphery of the element is necessarily much wider than that between the pleats at the inner periphery of the element. In order to avoid this disadvantage, and to form a filter element in which a larger area of filter paper can be accommodated in the same space as that occupied by a filter of the aforesaid star formation, it has been proposed to pleat the strip of sheet filter material from which the element is made in such a way that alternate pleats are of less width than the pleats therebetween, which are wider and extend the full radial distance from the outer periphery of the element to the inner periphery adjacent the perforate centre tube, the pleats thus being of "W" form when viewed looking from the outer periphery towards the inner periphery of the element. In such a construction the relatively wide spaces at the outer periphery of the element between the full width pleats are occupied at least in part by the narrower width pleats and an element having a larger area of filter paper can therefore be accommodated in the same space as a conventional star form filter element.

The proposed forms of construction of filter elements with "W" form pleats have not been found in practice to provide the improvements which might have been expected from the increased area of paper available, and have also involved difficulties in achieving a uniform assembly of the pleats and in some cases have proved to be less reliable in use than elements of the conventional star form.

The present invention was devised with the object of producing a filter element of pleated sheet filter material which would provide a greater surface area for filtration than a star form filter element occupying a similar space but without thereby giving rise to undue complexity of manufacture, or reducing the efficiency and reliability of the filter element.

The present invention solves the aforesaid problems by means of a fluid filter element formed into hollow cylindrical form from a strip of synthetic resin impregnated filter paper pleated in accordion fashion about two alternating sets of fold lines and joined at its ends so as to form a series of pleats which, viewed radially inwardly of the element, are of "W" form so that wide pleats which extend from the outer to the inner periphery of the element alternate with narrow pleats which extend only part of the distance towards said inner periphery, the creases between the two parts of each pleat, and the creases between adjacent pleats, being each of substantially rectangular "U" shape in section and formed by a pair of spaced parallel fold lines, which adjacent opposite longitudinal edges of the strip at the junctions between the wide and narrow pleats, are more widely spaced apart to form wider crease portions thereat, the two halves of each one of the wide pleats having impressed therein spacer formations which abut each other to space the two halves of each wide pleat from each other on the side of the paper which forms the outer peripheral surface of the element, and having further spacer formations which abut the narrow pleats so as to space each of the wide pleats from adjacent narrow pleats and which abut corresponding spacer formations of adjacent wide pleats so as to space each of the wide pleats from an adjacent wide pleat at the inner periphery of the element, the depth of the spacer formations and the width of the creases formed in the pleats being such that, when said wider crease portions between the wide and narrow pleats are in abutment with each other at the outer periphery of the element, the spacing between the wide and narrow pleats at and adjacent the outer periphery of the element, the spacing between the wide pleats at the inner periphery of the element, and the spacing between the two halves of each of the wide and the narrow pleats, locate the pleats in a substantially uniform radial disposition about the longitudinal axis of the element.

The ends of the pleats of the element may be sealed by embedding them in an annular layer of sealant, which may be a thermo-setting or cold-curing plastics material which bonds to the sheet filter material; and the layer of sealant may be carried in an annular end cap of metal or other relatively rigid material. The filter element is preferably mounted around a perforate centre tube, with the radially inner portions of the wide pleats in abutment with the centre tube and the ends of the centre tube sealed to said end plates.

Alternatively, or additionally, the pleats may be individually sealed, the apposed two portions of each one of the two sets of pleats being sealed to each other at the pleat ends, separately from adjacent pleats, by adhesive applied to the two longitudinal edges of the strip on that face thereof which will form the outer peripheral surface of the completed element.

The spacer formations are conveniently in the form of ribs and rectangular bar-shaped formations, (hereinafter referred to as spacer ribs and spacer bars) which are impressed in the two parts of each of the wide pleats, the ribs and bars being parallel to each other at right angles to the fold lines and being spaced from each other across the width of the strip, the ribs and bars conveniently alternating with each other. The narrow pleats may also have spacer formations impressed therein.

The spacer bars and ribs in one half of a wide pleat are longitudinally aligned with those in the other half, and the spacer bars are preferably formed of graduated depth so that, in the assembled filter element, the two parts of each wide pleat are spaced from each other by a greater distance at the outer periphery of the element than at the inner periphery thereof, by the abutment of the spacer bars on the halves of the pleats. The spacer ribs and bars extend over substantially the full radial width of each of the wide pleats.

The scope of the invention is defined by the appended claims; and the invention and the method by which it is to be performed are hereinafter particularly described with reference to the accompanying drawings in which:

FIG. 1 is a plan of a portion of a strip of sheet filter material impressed with fold lines and spacer formations in accordance with one preferred embodiment of the present invention;

FIG. 2 is an enlarged section on the line II—II of FIG. 1;

FIG. 3 is an enlarged section on the line III—III of FIG. 1;

FIG. 4 is an enlarged partial perspective view of the strip shown in FIG. 1, with the strip partially folded to form the "W" section pleats;

FIG. 5 is an enlarged perspective view of part of a filter element formed from the strip shown in FIG. 1, the pleats being unsealed at their ends;

FIG. 6 is a view similar to FIG. 5 but with the ends of the pleats individually sealed;

FIG. 7 is a part sectional elevation of a filter formed from the strip shown in FIG. 1;

FIG. 8 is a composite part sectional plan of FIG. 7 in which the filter end cap is shown partly removed in order to show the formation of pleats both with sealed and unsealed ends;

FIG. 9 is an enlarged section on the line 9—9 of FIG. 7;

FIG. 10 is an enlarged section on the line 10—10 of FIG. 7;

Figure 11:
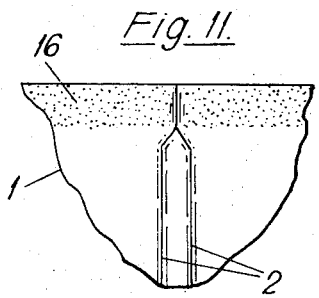
FIG. 11 is an enlarged detail of an edge portion of the strip of sheet filter material with a modified form of the pleat fold lines.

FIG. 1 shows a portion of a strip 1 of synthetic resin impregnated filter paper which, as shown in FIGS. 1 to 6, is impressed with two alternating series of parallel spaced transverse double fold lines 2 so as to form a first and a second set 3, 4 of accordion pleats in which each pleat of the second set 4 alternates with, and has a width, (as measured by the pleat fold line spacing) which is less than the width of the first set 3, the two halves a of a wide pleat 3 alternating lengthwise of the strip with the two halves b of a narrow pleat 4.

As shown in FIG. 3, alternate double fold lines 2 are of general "W" and "M" shape in section, the arrangement being such that, on folding as shown in FIGS. 4, 5, 6, 9 and 10, the creases formed between the two parts a-a or b-b of each wide or narrow pleat, and between adjacent pleats, are of substantially rectangular "U" shape in section. Moreover, as shown in particular in FIGS. 1, 5 and 6, the double fold lines 2 at the junction between one half of a wide pleat and the adjacent half of a narrow pleat are widened adjacent the longitudinal edges of the strip 1 so as to form wider crease portions 5 which, when the strip is folded to form the alternate narrow and wide pleats 3, 4, provide a predetermined spacing between the ends of the pleats 3, 4 at the outer periphery of the element. If desired, and if the pleats are relatively long compared to their width, the fold lines 2 may have one or more additional wider crease portions 5 intermediate opposite ends of the fold lines (see FIGS. 1 and 7).

The strip 1 also has impressed therein spacer formations comprising spacer ribs 6 and spacer bars 7, these being impressed in opposite sides of those parts of the strip which form the two halves a-a of each wide pleat 3. The spacer ribs 6 and spacer bars 7 extend longitudinally of the strip for substantially the full width of each half of a wide pleat 3 and the spacer ribs alternate with and are in a spaced parallel arrangement with the spacer bars 7 across the width of the strip 1, the bars 7 and ribs 6 in one half of the pleat being longitudinally aligned with those in the other half.

As shown in FIG. 3, the spacer bars 7 are formed so as to have a varying depth from one end to the other thereof, the deeper portion of the bar being adjacent that part of each half of a wide pleat which will lie at the outer peripheral portion of the pleated element. Thus, the abutment of a spacer bar 7 on one half of a pleat 3 with the corresponding spacer bar 7 on the other half of the pleat will ensure that the outer portions of the wide pleats 3 are spaced apart from each other by a greater distance than the inner portions thereof. The spacer ribs 6 are of uniform depth but could be graduated in depth if required.

After the strip 1 has been impressed with the fold lines 2 and spacer formations 6, 7 it can be folded in zig-zag fashion about the fold lines 2 and joined at its ends to form a filter element 10 (FIGS. 7 and 8) of hollow tubular form which is then fitted over a perforate centre tube 11 to which are secured annular end caps 12, the end caps having thereon an annular mass of adhesive 14 by which the end caps 12 are sealed to the ends of the element 10 and the open ends of the wide and narrow pleats 3, 4 are closed so as to form a series of wide and narrow pockets the mouths of which open at the outer periphery of the element.

As shown in FIG. 1, the ends of each of the wide and narrow pleats 3, 4 may, if desired, be individually sealed by means of lines of adhesive 16 applied along opposite longitudinal edges of the strip 1 on the side thereof which will form the outer peripheral surface of the element, the end portions of each of the two halves a-a and b-b of each pleat 3, 4 thereby being sealed to each other when the strip 1 is folded and the element then being sealed with the adhesive 14 to the end caps 12 as previously described. FIGS. 5 and 6 respectively show portions of a filter element 10 in which the ends of the pleats 3, 4 are initially unsealed and individually sealed.

As can be seen from FIGS. 4 to 6, 9 and 10, when the pleated strip 1 is folded to form the filter element 10 the wider spacer portions 5 at opposite ends of the fold lines 2 (and therebetween, if provided) between adjacent halves of wide and narrow pleats ensure that at the outer periphery of the element the ends of the pleats are uniformly circumferentially spaced by a predetermined distance determined by the width of the spacer portions 5 of the double fold lines 2. As shown in FIGS. 9 and 10, the abutment of the spacer bars 7 on the two halves of each wide pleat ensures that they are spaced apart from each other, and are more widely spaced from each other at the outer periphery of the element than at the inner periphery thereof; and the spacer ribs 6 space the narrow pleats 4 from the adjacent wide pleats 3 (especially at the inner portions of the narrow pleats) and also space the wide pleats 3 from each other adjacent the inner periphery of the element. It is found that the natural greater resistance to folding of the material in the narrow pleats 4, together with the spacing provided by the wider spacer portions 5, and the ribs 6 of the adjacent wide pleats 3, ensures that the two halves of each narrow pleat 4 will be adequately spaced apart from each other over the portions of the narrow pleats intermediate the spacer portions 5. The dimensions of the spacer portions 5 and of the spacer ribs 6 and spacer bars 7 are such that, for a filter element of predetermined inner and outer diameter the spacing provided by the co-operation of the spacer portions 5, the rectangular "U" shape creases formed by the double fold lines 2 and the spacer ribs 6 and spacer bars 7 will result in a pleat formation in which, around the element, the wide pleats 3 are spaced apart from each other and from the narrow pleat 4 by a predetermined minimum spacing and in such a way that the pleats 3,4 are arranged substantially uniformly radially with respect to the axis of the hollow tubular element.

Figure 12:
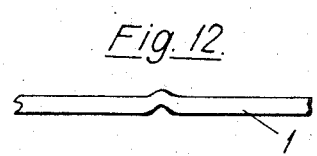
FIG. 12 is a side elevation of the sheet shown in FIG. 11.
Figure 13:
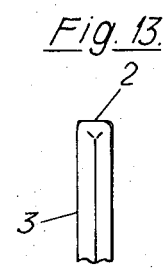
FIG. 13 is a detail end view of a pleat formed from the strip shown in FIGS. 11 and 12.

As shown in FIGS. 11, 12, and 13, if the ends of the pleats are to be individually sealed with adhesive the fold lines 2 which will form the creases of the wide and narrow pleats 3, 4 adjacent the inner peripheral portion of the element may be single fold lines over that portion of the double fold line 2 which will be covered by the adhesive 16, such an arrangement facilitating the formation of a tight fold and good adhesion between the two parts of each half of a pleat at the portion thereof adjacent the inner periphery of the element.

Figure 14:
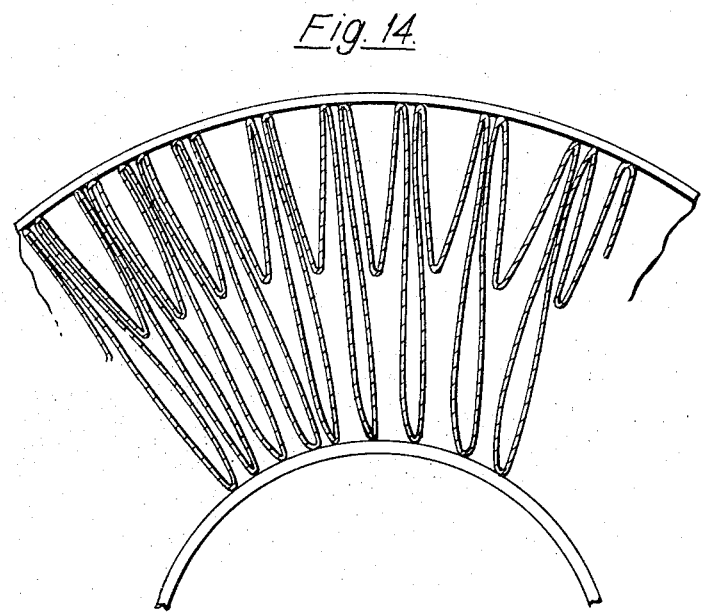
FIG. 14 is an enlarged section through one end of a known filter element having alternate wide and narrow pleats but not constructed in accordance with the present invention.

FIG. 14 was drawn from a photograph of a section of a known filter element formed with alternate wide and narrow pleats but not constructed in accordance with the present invention. As can be seen from FIG. 14 the disposition of the pleats is very irregular, some being much more closely spaced than others and the wide pleats in particular being in many cases not substantially radially directed. It will also be noticed that, in general, the narrow pleats exhibit much wider spacing between the two halves thereof than do the two halves of adjacent wide pleats. Such a pleat arrangement will not provide efficient utilization of the surface area of the filter material available for filtration, since, where the pleats are closely spaced the filter material will be unavailable for effective filtration after only a relatively shallow bed of deposited filtered material has accumulated thereon; and in other places, where the pleats are widely spaced, the space in which a filter bed can form will only be partly occupied with deposited solids when the filter as a whole has become incapable of further effective filtration. Moreover, because neither the narrow nor the wide pleats are supported relative to each other there will be a tendency for the pleats, particularly the wide pleats, to burst under pressure of the liquid to be filtered thereby rendering the filter element ineffective. Filters constructed in accordance with the present invention avoid the aforesaid disadvantages by reason of the precise spacing of the pleats and the support provided for the pleats by the spacer formations, resulting in a filter in which there is efficient utilization of the whole area of the filter paper and a very much reduced liability to damage to the pleats under pressure of the liquid to be filtered particularly when the filter paper has become embrittled through the effects of ageing and heat. The invention also results in a filter which is simple to manufacture, because after the folding of the paper the application of endwise pressure brings the spacer formations 5 into abutment with each other and this, together with the action of the spacer formations 6, 7 automatically forms the pleats 3, 4 into the desired disposition when the ends of the pleated strip 1 are joined and sealed.

Although in the preferred embodiment of the invention referred to the spacer formations are in the forms of ribs and bars, other formations, for example, series of dimples could be employed, with appropriate variation in depth, as required. The narrow pleats could also have spacer formations impressed therein, if desired or necessary.

It is found that the narrow pleats are conveniently approximately half the width of the wide pleats and that, with such pleat dimensions the element has approximately 50 percent more effective filter surface than an element with pleats of constant width occupying the same space.

We claim:

1. A fluid filter unit comprising a filter element formed into hollow cylindrical form from a strip of synthetic resin impregnated filter paper pleated in accordion fashion about two alternating sets of fold lines and joined at its ends so as to form a series of pleats which, viewed radially inwardly of the element, are of "W" form so that wide pleats which extend from the outer to the inner periphery of the element alternate with narrow pleats which extend only part of the distance towards said inner periphery, the creases between the two parts of each pleat, and the creases between adjacent pleats, being each of substantially rectangular "U" shape in section and formed by a pair of spaced parallel fold lines which, adjacent opposite longitudinal edges of the strip at the junctions between the wide and narrow pleats, are more widely spaced apart to form wider crease portions thereat, the two halves of each one of the wide pleats having impressed therein spacer formations which abut each other to space the two halves of each wide pleat from each other on the side of the paper which forms the outer peripheral surface of the element, and having further spacer formations which abut the narrow pleats so as to space each of the wide pleats from adjacent narrow pleats and which abut corresponding spacer formations of adjacent wide pleats so as to space each of the wide pleats from an adjacent wide pleat at the inner periphery of the element, the depth of the spacer formations and the width of the creases formed in the pleats being such that, when said wider crease portions between the wide and narrow pleats are in abutment with each other at the outer periphery of the element, the spacing between the wide and narrow pleats at and adjacent the outer periphery of the element, the spacing between the wide pleats at the inner periphery of the element, and the spacing between the two halves of each of the wide and narrow pleats, locate the pleats in a substantially uniform radial disposition about the longitudinal axis of the element; a perforate centre tube over which said element is fitted, with the radially inner creases of the wide pleats in abutment with said tube; and a pair of annular end caps respectively secured by adhesive to opposite ends of said element so as to seal the opposite ends of said wide and narrow pleats, the inner peripheral portions of said end caps being secured and sealed to the opposite ends of said centre tube.

2. A filter unit according to claim 1, in which the opposite ends of each of said wide and narrow pleats are individually sealed separately from adjacent pleats by adhesive applied to each longitudinal edge portion of the strip on that side thereof which forms the outer peripheral surface of the element.

3. A filter unit according to claim 1, including additional wider crease portions in said fold lines intermediate said wider crease portions at the ends of said fold lines.

4. A filter unit according to claim 1, in which said spacer formations are in the form of ribs and rectangular bars impressed in the strip, said spacer ribs and bars alternating across the width of the strip, and each spacer bar being graduated in depth from one end to the other of the bar, so that the two halves of each wide pleat are more widely spaced apart at the outer periphery of the element than at the inner periphery thereof.

5. A filter unit according to claim 1, in which said double fold lines are formed by impressions which are alternately of approximately "W" and "M" shape in section.

6. A filter unit according to claim 1, in which said narrow pleats are approximately half the radial width of the wide pleats.

* * * * *